April 8, 1952     A. B. JACOBSEN     2,591,821
MODULATOR CIRCUIT

Filed Nov. 29, 1945     2 SHEETS—SHEET 1

INVENTOR
ANDREW B. JACOBSEN

BY Ralph L Chappell
ATTORNEY

April 8, 1952 A. B. JACOBSEN 2,591,821
MODULATOR CIRCUIT
Filed Nov. 29, 1945 2 SHEETS—SHEET 2

INVENTOR
ANDREW B. JACOBSEN
BY Ralph L Chappell
ATTORNEY

Patented Apr. 8, 1952

2,591,821

UNITED STATES PATENT OFFICE 2,591,821

MODULATOR CIRCUIT

Andrew B. Jacobsen, Somerville, Mass., assignor, by mesne assignments, to the United States of America as represented by the Secretary of the Navy Application November 29, 1945, Serial No. 631,747

10 Claims. (Cl. 332—43)

This invention relates to modulator circuits, and more particularly to circuits for the amplitude modulation of an alternating current by means of a varying signal or modulator wave.

The primary object of the present invention is to provide a modulator circuit which will accurately amplitude modulate an alternating current in accordance with the wave form of a modulating wave; which will reverse the phase of the alternating current upon reversal of the phase of the modulating wave; and which will provide accurate modulation regardless of the wave form of the modulating wave.

A more specific object of the invention is to provide a modulator which will be accurate in response even with large input signal amplitude, a large input signal minimizing the effect of external noise. A further object is to provide a balanced modulator circuit in which the modulator wave does not appear in the output.

The purpose of the specific modulator here described is to modulate a 60-cycle current in accordance with the sine of an azimuth angle of a rotating radar antenna. A similar circuit is used to obtain a cosine wave modulated in similar fashion, so that the two signals may be used to drive a resolver in synchronism with the antenna. The output from the rotor of this resolver is then used to drive the deflection yokes on the plan position indicator (hereinafter called P. P. I.) tubes. Inasmuch as the cosine modulator circuit is the same as the sine modulator circuit, only one need be described. It should be borne in mind, however, that the modulator wave does not necessarily have to be of sine or cosine form, that is, the modulator circuit will operate with any desired modulator wave form.

To accomplish the foregoing general objects and other more specific objects which will hereinafter appear, my invention resides in the circuit elements and their relation one to another as are hereinafter described in the following specification. The specification is accompanied by drawings in which.

Figure 1:
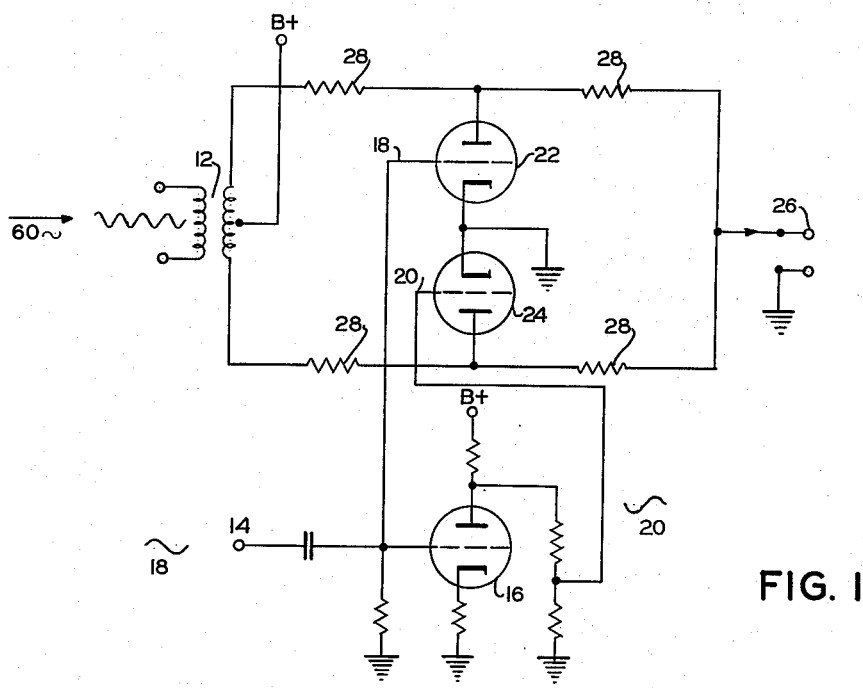
Fig. 1 is a schematic diagram of a modulator circuit embodying features of my invention.

Referring to the drawing, and more particularly to Fig. 1, the modulator circuit is intended to linearly amplitude modulate an alternating current supplied at transformer 12 in accordance with a relatively slowly changing modulator wave supplied at terminal 14. In the present case the modulator wave is indicated to be a sine wave, but this is not essential. The complete circuit includes means generally designated 16 to reverse the modulator wave, thereby making available two modulator waves opposite in phase, as indicated at 18 and 20. The modulator wave in original phase is applied directly to the grid of a first tube 22, while the oppositely phased modulator wave is applied to the grid of a second tube 24. The alternating current in the present case is an ordinary 60-cycle power line current, applied through transformer 12 to the anodes of tubes 22 and 24. The output is taken from the anodes of the tubes and combined in parallel at a terminal 26.

The arrangement is such that tube 22 absorbs energy and reduces the output during the positive swing of the modulator wave on the grid. At this time the tube 24 has a negative swing on the grid, and absorbs less energy, and therefore provides increased output. A half-cycle later, the grid of tube 22 swings negative and is made less conductive and therefore absorbs less energy, providing increased output, while tube 24 on the other hand provides decreased output. This results in a reversal of phase of the amplitude modulated output current at the crossover point (reversal of phase) of the modulator wave. The circuit is completed by four fixed resistors 28, which are preferably equal in resistance.

Figure 2:
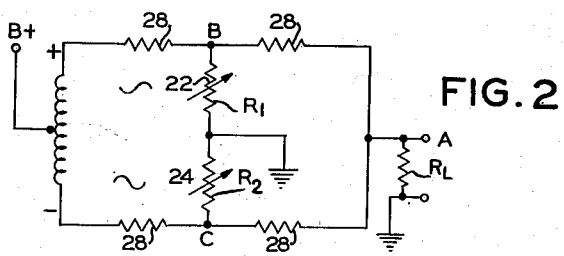
Fig. 2 is an equivalent circuit explanatory of Fig. 1.

The operation of the circuit of Fig. 1 may be more easily understood by referring to the equivalent circuit of Fig. 2 in which the tubes are replaced by variable resistors. In the steady state condition $R_1 = R_2$ and the voltage at B will equal the voltage at C.

Assume that a voltage of the polarity indicated in Fig. 2 is impressed across the transformer. When $R_1$ increases as it does when the grid goes negative, the voltage at point B increases. At the same time $R_2$ decreases and causes the voltage at C to decrease. The voltage at point A, which is located between two equal resistors 28 across points B and C, will now increase proportionally. When $R_2$ increases and $R_1$ decreases, the reverse takes place and the voltage at point A will now decrease. On the reverse polarity of the applied signal the reverse effect will take place. If resistors $R_1$ and $R_2$ are varied by sinusoidal modulator waves, the output at A will also vary sinusoidally. Since a 60-cycle alternating current is impressed across B—C it is made to vary in amplitude with the modulator wave, and as the phase of the modulator wave reverses, the phase of the alternating wave will reverse (relative to the input alternating wave).

Figure 3:
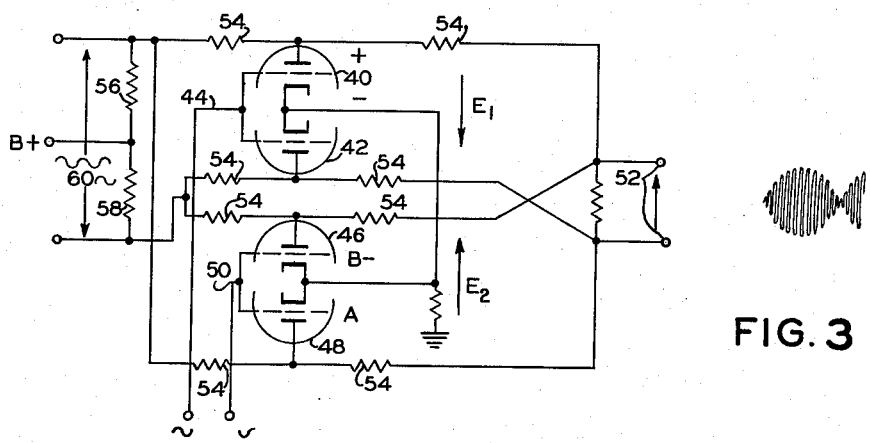
Fig. 3 is a diagram of a balanced modulator which modifies and improves the circuit of Fig. 1.

A modified circuit, shown in Fig. 3, was found to have some improvements for the particular radar use intended. This improved circuit is really two similar circuits with the two connected in such a manner as to give an output which is the difference between the two individual outputs.

Figure 6:
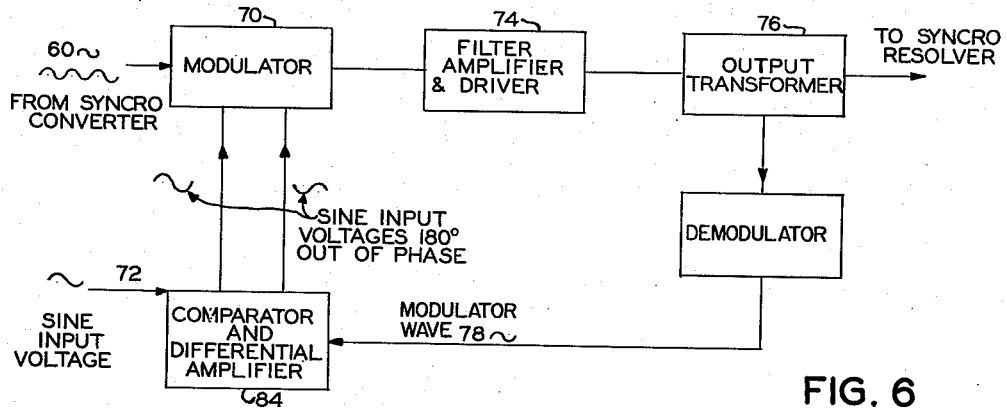
Fig. 6 is a block diagram of the modulator section of a radar relay system showing the use of the modulator in relation to the rest of the system.

Referring to Fig. 3 the means to reverse the phase of the modulator wave in order to have two oppositely phased modulator waves available is not shown in this figure, although it is included in the block diagram of Fig. 6. The circuit shown in Fig. 3 comprises a first pair of tubes 40, 42 and the 60-cycle alternating current input is applied across the anodes of these tubes. One of the two oppositely phased modulator waves is supplied by lead 44 to the grids of the tubes in parallel. A second pair of tubes 46 and 48 also receives the alternating current input across their anodes. The other of the oppositely phased modulator waves is supplied by lead 50 to the grids of the tubes in parallel. The output terminals 52 are connected across the anodes of the first pair of tubes 40, 42 and also across the anodes of the second pair of tubes 46, 48, this connection being in parallel with the first pair of tubes. The fixed resistors 54 are all equal.

With this arrangement, the pair of tubes 40, 42 absorbs energy and reduces the output available at terminals 52 during the positive swing of the grids of tubes 40, 42, while the tubes 46, 48 are made less conductive and absorb less energy and provide increased output at the terminals 52 because of the negative swing on the grids of the tubes 46, 48. The opposite holds true when the modulator wave reverses in phase. The phase of the modulated output current reverses when the phase of the modulator wave reverses.

The operation of the circuit may be described with reference to Fig. 4, which is a simplified equivalent circuit. In the equivalent circuit, the tubes have been replaced by variable resistors, because the tubes in the modulator act as resistances, with values depending on the grid bias. $R_1$ stands for tubes 40, 42 and $R_2$ for tubes 46, 48, and all resistances other than these two are fixed and equal. The 60-cycle carrier signal to be modulated, is applied across the series resistors, 56 and 58. The output load 52 of the modulator is represented by $R_L$.

From the equivalent circuit drawn in this way, it is evident that there are two parallel branches or sections of the modulator, each section being shunted by one of the variable resistors (tubes), and each section contributing to the voltage applied across the load. With reference to any chosen polarity of the input 60-cycle carrier the contribution made by the upper section of the circuit to the load $R_L$ will always be opposite in phase to the contribution made by the lower section. Consequently, the polarity of the resultant voltage across the load at any moment will be determined by which of these two contributions is the larger at that moment; and if the two contributions are equal, their phase opposition will produce a net voltage of zero across the load.

For example, assume to begin with that $R_1$ and $R_2$ are equal. Then $E_1$ and $E_2$ will also be equal; but as applied across $R_L$ they are opposite in phase, and will therefore cancel, producing zero net voltage across the load $R_L$. Suppose that $R_1$ increases slightly and $R_2$ decreases slightly, $E_1$ will now be slightly larger than $E_2$, and the resultant voltage across $R_L$ will be equal in magnitude to the difference between these two voltages, and will have the polarity of $E_1$. On the other hand, if $R_1$ decreases slightly and $R_2$ increases slightly, $E_1$ will now be smaller than $E_2$, and the resultant voltage across $R_L$ will be equal in magnitude to the difference between these two, but will have the polarity of $E_2$.

Since the current-voltage relation in a resistive circuit is linear, the output voltage across $R_L$ is proportional to the difference between $R_1$ and $R_2$. Therefore if the difference between $R_1$ and $R_2$ varies sinusoidally, the output 60-cycle signal across the load will be amplitude-modulated in a sinusoidal fashion. The operating portion of the tube characteristics is sufficiently linear to make the resistance of each tube vary sinusoidally with its grid bias voltage.

In the actual circuit (Fig. 3), the modulator tubes are the two double triodes 40, 42 and 46, 48. The plate circuits of each of these tubes are fed in phase opposition by the 60-cycle input signal across resistors 56, 58. Since the outputs of the two sections are 180° out of phase, the resultant voltage appearing across the load at any time depends on the difference between the contributions of the two sections at that time. The polarity of the stronger of the two contributing voltages, and the amplitude of the resultant will be proportional to the difference of their amplitudes. The difference in turn depends on the difference between the grid bias of tubes 40, 42 and the grid bias of tubes 46, 48.

Figure 5:
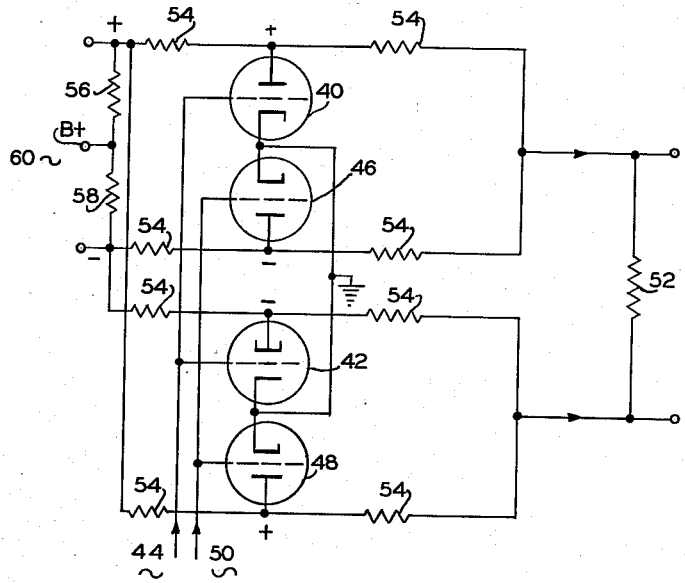
Fig. 5 is a rearranged version of the circuit of Fig. 3.

In order to better show the relation between the improved circuit of Fig. 3 and the more elemental circuit of Fig. 1 the circuit of Fig. 3 has been rearranged in Fig. 5, like parts being given like numerals. Comparing Figs. 1 and 5 it will be seen that the upper section of Fig. 5 (tubes 40, 46) is like the circuit of Fig. 1 (tubes 22, 24), and similarly the lower section of Fig. 5 (tubes 42, 48) is like the circuit of Fig. 1 (tubes 22, 24). These two circuits of Fig. 5 are operated in reversed phase, that is, the leads for the 60-cycle supply to the lower circuit are reversed compared to those entering the upper circuit, and the same applies to the modulator wave inputs 44, 50 to each section. The outputs are then combined differentially across the output resistor 52.

Figure 4:
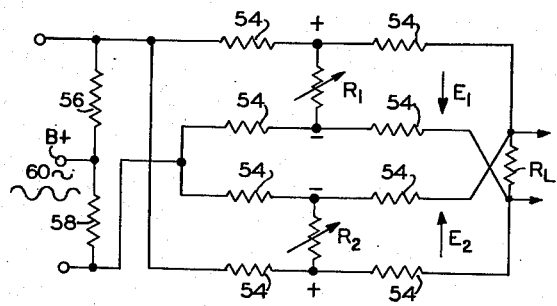
Fig. 4 is an equivalent circuit which illustrates the operation of the circuit of Fig. 3.

Referring now to Fig. 6 the modulator circuit of Figs. 3, 4, and 5 is represented by block 70. The modulator wave 72 is supplied to a comparator and differential amplifier block 84. A generally similar modulator wave 78 is obtained as a feedback (for reasons not necessary to explain here, but stated in my copending application Serial No. 631,746, filed November 29, 1945) and is also fed into this same comparator and amplifier circuit 84, where the two waves of different amplitude and like phase are compared and converted to two modulator waves of equal amplitude but 180° out of phase, which are then amplified and fed to the grids of tubes 40, 42 and 46, 48 to control the output of these modulator tubes, all as previously described. The output from the modulator is fed into a 120-cycle rejection filter and amplifier 74, which removes any harmonic signals of 120-cycles generated in the modulator by nonlinear elements, and then amplifies the amplitude modulated wave to feed the primary of the output transformer 76. The output from this transformer 76, which is a 60-cycle amplitude modulated wave, is in the case of radar use of the invention, fed to a synchro resolver, where along with a similar cosine wave it drives the P. P. I. tubes.

It is believed that the construction and operation as well as the advantages of my improved modulator circuit will be apparent from the foregoing detailed description thereof. It will also be apparent that while I have shown and described the invention in several preferred forms, changes may be made in the circuits disclosed without departing from the spirit of the invention as sought to be defined in the following claims.

What is claimed is:

1. A modulating circuit comprising a source of alternating current potential, a source of modulating potential, a load circuit, a voltage divider resistance network including a plurality of variable impedance devices, means for connecting said load circuit to said variable impedance devices of said voltage divider, means for applying said alternating current potential to said voltage divider, and means responsive to said modulating potential for varying the impedance of said devices.

2. A modulating circuit comprising a source of alternating current potential, a source of modulating potential, a load circuit, a voltage divider resistance network including a plurality of variable impedance devices, means for connecting said load circuit in shunt with said variable impedance devices of said voltage divider, means for applying said alternating current potential to said voltage divider, and means responsive to said modulating potential for varying the impedance of said devices.

3. A modulating circuit comprising a source of alternating current potential, a source of modulating potential, a load circuit, a voltage divider circuit including a plurality of electron tubes each having at least an anode, a cathode, and a control grid, means for energizing said load circuit from the plate connections of said tubes, means for applying said alternating current potential to said voltage divider circuit, and means for applying said modulating potential to said control grids whereby the plate resistance of said tubes is varied in response to said modulating potential to vary the potential at said load circuit.

4. A modulating circuit comprising a source of alternating current potential, a source of modulating potential, a load circuit, a voltage divider circuit including a plurality of electron tubes each having at least an anode, a cathode, and a control grid, means for biasing said electron tubes to a linear portion of their operating characteristic, means for energizing said load circuit from the plate connections of said tubes, means for applying said alternating current potential to said voltage divider circuit, and means for applying said modulating potential to said control grids whereby the plate resistance of said tubes is varied linearly in response to amplitude changes of said modulating potential to vary the potential at said load circuit.

5. A balanced absorption modulator comprising a source of alternating current potential, a source of modulating potential, a load, a voltage divider resistance network adapted to provide a center tap reference point, a pair of electron tubes having at least anodes, cathodes, and control grids and having a common cathode circuit and connected to shut an electrically symmetrical portion of said voltage divider network, means biasing said electron tubes to a linear portion of their operating characteristics, means to energize said load from said reference point, means for applying said alternating current potential to said voltage divider network, and means for applying said modulating potential to said control grids in such phase relationship as to increase the plate resistance of one of said electron tubes as the other decreases in response to the amplitude changes of said modulating potential, whereby said alternating current is linearly amplitude modulated.

6. A balanced absorption modulator circuit comprising a source of alternating current potential, a source of modulating potential, a load circuit, a voltage divider resistance network adapted to provide a center tap reference point, a pair of electron tubes having at least anodes, cathodes, and control grids and having a common cathode circuit and connected to shunt an electrically symmetrical portion of said voltage divider network, means to bias said electron tubes to a linear portion of their operating characteristics, means to connect said load circuit between said reference point and said cathode circuit, means for applying said alternating current potential to said voltage divider, and means for applying said modulating potential to said control grids in such phase relationship as to increase the plate resistance of one of said electron tubes as the other decreases in response to amplitude changes of said modulating potential, whereby said alternating current is linearly amplitude modulated.

7. A balanced absorption modulator comprising a source of modulating potential, a source of alternating current potential, a load circuit, a first voltage divider network, a second voltage divider network, each of said networks including an electrically symmetrical portion shunted by a pair of electron tubes having at least anodes, cathodes, control grids, and a common cathode connection, means to bias said electron tubes to a linear portion of their operating characteristics, means for applying said alternating current potential to said voltage divider networks connected to form two parallel networks, means for applying said modulating potential to said control grids in such phase relationship to said alternating current potential that the plate resistance of the electron tubes in one of said networks increases as the plate resistance of the electron tubes in the other of said networks decreases, and means to connect said load circuit to said parallel networks whereby said load circuit is energized by the difference of the voltage distribution in said voltage divider networks.

8. A modulating circuit comprising, a source of alternating current potential, a source of load potential, a load circuit, a voltage divider resistance network including a plurality of electron tubes each having at least an anode, a cathode, and a control grid, means for connecting said load circuit in shunt with the anode circuit of said electron tubes, means for applying said alternating current potential to said voltage divider, and means for applying said modulating potential to said control grids of said electron tubes for varying the impedance of said electron tubes to vary the potential across said load circuit.

9. A balanced absorption modulator comprising, a source of modulating potential, a load circuit, first and second voltage divider networks, each of said networks including a plurality of electron tubes, said electron tubes having at least anodes, cathodes and control grids, means for applying said alternating current to said voltage divider network connected to form two parallel networks, means for applying said modulating potential to said control grids in such phase relationship to said alternating current potential that the impedance change of said first network is opposite in sense to the impedance change of said second network, and means for energizing said load circuit from the difference of potential distribution across said first and second networks.

10. A balanced absorption modulator comprising, a source of modulating potential, a load circuit, first and second voltage divider networks, each of said networks including a plurality of electron tubes, said electron tubes having at least anodes, cathodes and control grids, means for applying said alternating current to said voltage divider network connected to form two parallel networks, means for biasing said electron tubes to a linear portion of their operating charateristics, means for applying said modulating potential to said control grids in such phase relationship to said alternating current potential that the impedance change of said first network is opposite in sense to the impedance change of said second network, and means for energizing said load circuit from the difference of potential distribution across said first and second networks.

ANDREW B. JACOBSEN.

REFERENCES CITED

The following references are of record in the file of this patent:

UNITED STATES PATENTS

| Number | Name | Date |
|---|---|---|
| 1,654,902 | Smythe | Jan. 3, 1928 |
| 1,672,056 | Carson | June 5, 1928 |
| 2,211,003 | Conklin | Aug. 13, 1940 |
| 2,275,020 | Purington | Mar. 3, 1942 |
| 2,403,053 | Conklin | July 2, 1946 |